(12) United States Patent
Reppel et al.

(10) Patent No.: US 8,551,210 B2
(45) Date of Patent: Oct. 8, 2013

(54) COMPOSITE ARTICLE WITH MAGNETOCALORICALLY ACTIVE MATERIAL AND METHOD FOR ITS PRODUCTION

(75) Inventors: Georg Werner Reppel, Hammersbech (DE); Matthias Katter, Alzenau (DE)

(73) Assignee: Vacuumschmelze GmbH & Co. KG, Hanau (DE)

( * ) Notice: Subject to any disclaimer, the term of this patent is extended or adjusted under 35 U.S.C. 154(b) by 772 days.

(21) Appl. No.: 12/595,217

(22) PCT Filed: Dec. 27, 2007

(86) PCT No.: PCT/IB2007/055316
§ 371 (c)(1),
(2), (4) Date: Oct. 8, 2009

(87) PCT Pub. No.: WO2009/090442
PCT Pub. Date: Jul. 23, 2009

(65) Prior Publication Data
US 2011/0168363 A9    Jul. 14, 2011

(51) Int. Cl.
*C22C 1/05*    (2006.01)
*B22F 3/02*    (2006.01)
*B22F 3/12*    (2006.01)
*H01F 1/00*    (2006.01)
*F25B 21/00*   (2006.01)

(52) U.S. Cl.
USPC ............ 75/229; 75/246; 75/247; 75/249; 62/3.1; 252/62.55; 148/301

(58) Field of Classification Search
USPC .......... 75/247, 249; 252/62.55, 62.57; 62/3.1; 148/301
See application file for complete search history.

(56) References Cited

U.S. PATENT DOCUMENTS

| | | | |
|---|---|---|---|
| 428,057 | A | 5/1890 | Tesla |
| 3,841,107 | A | 10/1974 | Clark |
| 4,112,699 | A | 9/1978 | Hudson, III et al. |
| 4,322,257 | A | 3/1982 | Menth et al. |
| 4,332,135 | A | 6/1982 | Barclay et al. |
| 4,849,017 | A | 7/1989 | Sahashi et al. |
| 6,446,441 | B1 | 9/2002 | Dean |
| 6,588,215 | B1 | 7/2003 | Ghoshal |
| 6,676,772 | B2 | 1/2004 | Saito et al. |
| 6,826,915 | B2 | 12/2004 | Wada et al. |
| 7,063,754 | B2 | 6/2006 | Fukamichi et al. |
| 7,076,959 | B2 | 7/2006 | Lewis |
| 7,168,255 | B2 | 1/2007 | Saito et al. |
| 7,186,303 | B2 | 3/2007 | Kogure et al. |
| 7,670,443 | B2 | 3/2010 | Kogure et al. |
| 7,695,574 | B2 | 4/2010 | Nakajima |
| 7,914,628 | B2 | 3/2011 | Tsuji et al. |
| 8,037,692 | B2 | 10/2011 | Muller et al. |
| 2004/0079446 | A1 | 4/2004 | Kogure et al. |
| 2004/0093877 | A1 | 5/2004 | Wada et al. |
| 2004/0182086 | A1 | 9/2004 | Chiang et al. |
| 2004/0194855 | A1 | 10/2004 | Fukamichi et al. |
| 2004/0261420 | A1 | 12/2004 | Lewis |
| 2005/0172643 | A1 | 8/2005 | Lewis |
| 2006/0005898 | A1 | 1/2006 | Liu et al. |
| 2006/0076084 | A1 | 4/2006 | Nakajima |
| 2006/0213580 | A1 | 9/2006 | Tsuji et al. |
| 2006/0218936 | A1 | 10/2006 | Kobayashi et al. |
| 2006/0231163 | A1 | 10/2006 | Hirosawa et al. |
| 2007/0137732 | A1 | 6/2007 | Kogure et al. |
| 2007/0218319 | A1 | 9/2007 | Ohkoshi et al. |
| 2007/0220901 | A1 | 9/2007 | Kobayashi et al. |
| 2008/0078184 | A1 | 4/2008 | Saito et al. |
| 2008/0078476 | A1 | 4/2008 | Saito et al. |
| 2010/0037625 | A1 | 2/2010 | Katter |
| 2010/0047527 | A1 | 2/2010 | Katter |
| 2010/0129794 | A1 | 5/2010 | Fabis et al. |
| 2011/0048690 | A1 | 3/2011 | Reppel et al. |
| 2011/0140031 | A1 | 6/2011 | Katter et al. |
| 2011/0151230 | A1 | 6/2011 | Katter |
| 2011/0198069 | A1 | 8/2011 | Katter et al. |

FOREIGN PATENT DOCUMENTS

| | | |
|---|---|---|
| DE | 103 38 467 A1 | 3/2004 |
| DE | 10330574 | 6/2004 |
| DE | 10 2006 015 370 A1 | 10/2006 |
| DE | 112007003401 | 1/2010 |
| EP | 0 187 538 A2 | 7/1986 |
| EP | 0217347 B1 | 2/1993 |
| EP | 1 867 744 | 12/2007 |
| EP | 1 867 744 A1 | 12/2007 |
| EP | 1 463 068 B1 | 2/2009 |
| GB | 1076036 | 7/1967 |
| GB | 1398588 A | 6/1975 |
| GB | 2 424 901 A | 10/2006 |
| GB | 2 458 039 A | 9/2009 |
| GB | 2 459 066 A | 10/2009 |
| GB | 2 460 774 A | 12/2009 |
| JP | 60204852 A | 10/1985 |
| JP | 62243377 A | 10/1987 |
| JP | 63-055906 | 3/1988 |

(Continued)

OTHER PUBLICATIONS

Barrett, C.S., "Crystal Structure of Metals," *ASM Handbook*, Formerly Ninth Edition, Metals Handbook, vol. 9, ASM International, Materials Park, OH (1985), pp. 8-9.

(Continued)

*Primary Examiner* — George Wyszomierski
*Assistant Examiner* — Ngoclan T Mai
(74) *Attorney, Agent, or Firm* — Buchanan Ingersoll & Rooney PC (57) ABSTRACT

A composite article (1; 10; 40) comprises a plurality of inclusions (5) of a magnetocalorically active material embedded in a matrix (4) of a magnetocalorically passive material. The inclusions (5) and the matrix (4) have a microstructure characteristic of a compacted powder.

34 Claims, 5 Drawing Sheets

(56) References Cited

FOREIGN PATENT DOCUMENTS

| | | |
|---|---|---|
| JP | 63083235 A | 4/1988 |
| JP | 02-190402 | 7/1990 |
| JP | 4338604 A | 11/1992 |
| JP | 4338605 A | 11/1992 |
| JP | 7320918 A | 12/1995 |
| JP | 2000-54086 | 2/2000 |
| JP | 2000-274976 A | 10/2000 |
| JP | 2002-69596 | 3/2002 |
| JP | 2002-356748 A | 12/2002 |
| JP | 2003-28532 A | 1/2003 |
| JP | 2005-036302 A | 2/2005 |
| JP | 2005-93729 | 4/2005 |
| JP | 2005-113209 | 4/2005 |
| JP | 2005120391 A | 5/2005 |
| JP | 2006-89839 A | 4/2006 |
| JP | 2006124683 A | 5/2006 |
| JP | 2006-283074 A | 10/2006 |
| JP | 2007-031831 A | 2/2007 |
| JP | 2007-084897 A | 4/2007 |
| JP | 2007-281410 A | 10/2007 |
| JP | 2007291437 A | 11/2007 |
| JP | 2005-226125 | 8/2008 |
| JP | 2009-249702 A | 10/2009 |
| WO | WO 93/25857 | 12/1993 |
| WO | WO 00/45397 A1 | 8/2000 |
| WO | WO 2004/019379 A2 | 3/2004 |
| WO | WO 2005/066980 A2 | 7/2005 |
| WO | WO 2006/074790 A1 | 7/2006 |
| WO | WO 2007/026062 A1 | 3/2007 |
| WO | WO 2007/065933 A1 | 6/2007 |
| WO | WO 2008/099234 A9 | 8/2008 |
| WO | WO 2008/099235 A1 | 8/2008 |
| WO | WO 2009/090442 A1 | 7/2009 |
| WO | WO 2010/038098 A1 | 4/2010 |
| WO | WO 2010/128357 A1 | 11/2010 |

OTHER PUBLICATIONS

Bulanova, M. V. et al., "Lanthanum-silicon System," *Journal of Alloys and Compounds* 329 (2001) (pp. 214-223).

Chang, H. et al., "Theoretical Study of Phase Forming of NaZn$_{13}$-type Rare-Earth Intermetallics," *J. Phys.: Condens. Matter*, vol. 15 (2003) pp. 109-120 XP002385787.

Fujieda, S. et al., "Enhancement of Magnetocaloric Effects in La$_{1-z}$,Pr$_z$ (Fe$_{0.88}$ Si$_{0.12}$)$_{13}$ and their Hydrides," *Journal of Applied Physics* 102, 023907 (2007) American Institute of Physics (5 pages).

Fujieda, S. et al., "Giant Isotropic Magnetostriction of Itinerant-Electron Metamagnetic La(Fe$_{0.88}$ Si$_{0.12}$)$_{13}$ H$_y$ Compounds," Applied Physics Letters, vol. 79, No. 5, Jul. 30, 2001, pp. 653-655.

Fujieda, S. et al., "Large Magnetocaloric Effect in La(Fe$_x$ Si$_{1-x}$)$_{13}$ Itinerant-Electron Metamagnetic Compounds," *Applied Physics Letters*, vol. 81, No. 7, Aug. 12, 2002, American Institute of Physics (2002), pp. 1276-1278.

Fujieda, S. et al., "Strong Magnetocaloric Effects in La$_{1-z}$ Ce$_z$ (Fe$_{x-y}$ Mn$_y$ Si$_{1-x}$)$_{13}$ at Low Temperatures," *Applied Physics Letters*, vol. 89, 062504 (2006) American Institute of Physics (3 pages).

Fujita, A. et al., "Control of Large Magnetocaloric Effects in Metamagnetic La(Fe$_x$ Si$_{1-x}$)$_{13}$ Compounds by Hydrogenation," *Journal of Alloys and Compounds* 404-406 (2005) pp. 554-558, Elsevier B.V. (5 pages).

Fujita, A. et al., "Giant Magnetovolume and Magentocaloric Effects in Itinerant-Electron Metamagnetic La(Fe$_x$ Si$_{1-x}$)$_{13}$ Compounds," *Materia Japan*, vol. 41, No. 4, Apr. 20, 2002, pp. 269-275.

Fujita, A. et al., "Giant Volume Magnetostriction Due to the Itinerant Electron Metamagnetic Transition in La(Fe-Si)$_{13}$ Compounds," Department of Materials Science, Graduate School of Engineering, IEEE Transactions on Magnetics, vol. 35, No. 5, Sep. 1999 (pp. 3796-3798).

Hu, F. X. et al., "Magnetic Entropy Change in La (Fe$_{0.98}$ Co$_{0.02}$)$_{11.7}$ Al$_{1.3}$," *J. Phys.: Condens. Matter*, vol. 12 (2000) L691-696.

Hu, F. X. et al., "Magnetic Entropy Change and its Temperature Variation in Compounds La(Fe$_{1-x}$Co$_x$)$_{11.2}$ Si$_{1.8}$," *Journal of Applied Physics*, vol. 92, No. 7, Oct. 1, 2002, American Institute of Physics (2002) pp. 3620-3623.

Katter, M. et al., "Magnetocaloric Properties of La(Fe, Co, Si)$_{13}$ Bulk Material Prepared by Powder Metallurgy," Vacuumschmelze GmbH and Company KG, *IEEE Transactions on Magnetics*, vol. 44, No. 11, Nov. 2008 (pp. 3044-3047).

Kneller, E., "Ferromagnetismus," Springer-Verlag, 1962 (1 page).

Mandal, K. et al., "Magnetocaloric Effect in Reactively-Milled LaFe$_{11.57}$ Si$_{1.43}$ H$_y$ Intermetallic Compounds," *Journal of Applied Physics* 102, 053906 (2007) American Institute of Physics (5 pages).

Massalski, Th.B., "Diagram 1074," Binary Alloy Phase Diagrams, Ed. J.L. Murray, L.H. Benett, H. Backer, American Society of Metals Ohio, (1986) 1074.

Massalski, Th.B., "Diagram 1108," Binary Alloy Phase Diagrams, Ed. J.L. Murray, L.H. Benett, H. Backer, American Society of Metals Ohio, (1986) 1108.

Richard, M.A. et al., "Magnetic Refrigeration: Single and Multimaterial active Magnetic Regenerator Experiments," *Journal of Applied Physics*, vol. 95, No. 4, Feb. 15, 2004, pp. 2146-2150, American Institute of Physics (6 pages).

Saito, A. T. at al., "Magnetocaloric Effect of New Spherical Magnetic Refrigerant Particles of La(Fe$_{1-x-y}$ Co$_x$ Si$_y$)$_{13}$ Compounds," *ScienceDirect, Journal of Magnetism and Magnetic Materials* 310 (2007) 2808-2810, www.sciencedirect.com (pp. 2808-2810).

Tishin, A.M. et al., "The Magnetocaloric Effect and its Applications," Institute of Physics Publishing, Bristol and Philadelphia, IOP Publishing Ltd. 2003, pp. 371-375.

Villars, P. et al., "Diagram 10375," *Handbook of Ternary Alloy Phase Diagrams*, 2$^{nd}$ Ed., ASM International, 10 (1997) 10375 (1 page).

Villars, P. et al., "Diagram 8502," Handbook of Ternary Alloy Phase Diagrams, 2$^{nd}$ Ed., ASM International, 7 (1997) 8502 (1 page).

Wang, J. at al., "The Hydrogenation Behavior of LaFe$_{11.44}$ Si$_{1.56}$ Magnetic Refrigerating Alloy," *Journal of Alloys and Compounds*, vol. 485 (2009) pp. 313-315, Elsevier B.V. (3 pages).

Zhang, H. et al., "The Spike in the Relation Between Entropy Change and Temperature in LaFe$_{11.83}$ Si$_{1.17}$ Compound," ScienceDirect, *Journal of Magnetism and Magnetic Materials* 320 (2008) 1879-1883, www.sciencedirect.com (pp. 1879-1883).

Zhang, X. X. et al., "Magnetic Entropy Change in Fe-based Compound LaFe$_{10.6}$ Si$_{2.4}$," Applied Physics Letters, vol. 77, No. 19, Nov. 16, 2000, pp. 3072-3074 (2000) American Institute of Physics.

Zimm, C. et al., "Description and Performance of a Near-Room Temperature Magnetic Refrigerator," *Advances in Cryogenic Engineering*, vol. 43, Plenum Press, New York, (1998) pp. 1759-1766.

Japanese Office Action corresponding to JP Patent Application No. 2010-504885 dated Nov. 1, 2011.

Form PCT/IB/326; Form PCT/IB/373 and Form PCT/ISA/237 corresponding to PCT/IB/2009/051854 dated Nov. 17, 2011.

Notice of Reasons for Rejection corresponding to JP 2010-511750 dated Sep. 13, 2011.

Examination Report under Section 18(3) corresponding to GB Application No. 1015392.2 dated Sep. 14, 2011.

Examination Report Under Section 18(3) dated Apr. 20, 2012 issued by U.K. Patent Office in corresponding GB Application No. 0915603.5.

Abstract of Jun-Fa Ji; Chuen-Guang Chao, "A novel technique for manufacturing metal-bonded Nd-Fe-B magnets by squeeze casting," Metallurgical and Materials Transactions A (Physical Metallurgy and Material Science) ISSN 1073-5623, 2002, vol. 33, No. 3, pp. 637-646 (10p.).

Jun-Fa Ji and Chuen-Guang Chao, "A novel technique for manufacturing metal-bonded Nd—Fe—B magnets by squeeze casting," Metallurgical and Materials Transactions A (Physical Metallurgy and Material Science) ISSN 1073-5623, 2002, vol. 33, No. 3, pp. 637-646 (10p.).

Yoshichika Otani et al., "Metal Bonded Sm$_2$ Fe$_{17}$ N$_{3\delta}$ magnets," Department of Pure and Applied Physics, Trinity College, Dublin 2, Ireland, J. Appl. Phys. 69 (9), May 1, 1991, 1991 American Institute of Physics, pp. 6735-6737.

COMPOSITE ARTICLE WITH MAGNETOCALORICALLY ACTIVE MATERIAL AND METHOD FOR ITS PRODUCTION

BACKGROUND

1. Field

Disclosed herein is a composite article with magnetocalorically active material and to methods for producing a composite article with magnetocalorically active material.

2. Description of Related Art

The magnetocaloric effect describes the adiabatic conversion of a magnetically induced entropy change to the evolution or absorption of heat. Therefore, by applying a magnetic field to a magnetocaloric material, an entropy change can be induced which results in the evolution or absorption of heat. This effect can be harnessed to provide refrigeration and/or heating.

In recent years, materials such as $La(Fe_{1-a}Si_a)_{13}$, $Gd_5(Si, Ge)_4$, Mn (As, Sb) and MnFe(P, As) have been developed which have a Curie Temperature, $T_c$, at or near room temperature. The Curie Temperature translates to the operating temperature of the material in a magnetic heat exchange system. Consequently, these materials are suitable for use in applications such as building climate control, domestic and industrial refrigerators and freezers as well as automotive climate control.

Magnetic heat exchange technology has the advantage that magnetic heat exchangers are, in principle, more energy efficient than gas compression/expansion cycle systems. Furthermore, magnetic heat exchangers are environmentally friendly as ozone depleting chemicals such as CFC's are not used.

Consequently, magnetic heat exchanger systems are being developed in order to practically realise the advantages provided by the newly developed magnetocaloric materials. Magnetic heat exchangers, such as that disclosed in U.S. Pat. No. 6,676,772, typically include a pumped recirculation system, a heat exchange medium such as a fluid coolant, a chamber packed with particles of a magnetic refrigerant working material which displays the magnetocaloric effect and a means for applying a magnetic field to the chamber.

Further developments of these systems have been directed towards optimizing the composition of the magnetocaloric material so as to increase the entropy change and to increase the temperature range over which the entropy change occurs. This enables smaller applied magnetic fields to be used to achieve sufficient cooling and a stable refrigeration cycle to be achieved over a larger temperature range.

These measures aim to simplify the design of the heat exchange system since smaller magnetic fields can be produced by a permanent magnet rather than an electromagnet or even a superconducting magnet.

The magnetic refrigerant working material may also be provided in the form of a composite. For example, U.S. Pat. No. 6,826,915 discloses a regenerative bed comprising a magnetic refrigeration material including a binder comprising a metal or alloy of high ductility and a magnetocaloric material of the NiAs-type.

However, further improvements are desirable to enable a more extensive application of magnetic heat exchange technology.

SUMMARY

Disclosed herein are embodiments of a composite article comprising magnetocalorically active material which can be reliably and cost effectively manufactured. Also disclosed herein are embodiments of methods by which the composite article may be produced.

A particular embodiment relates to a composite article comprising a plurality of inclusions of a magnetocalorically active material embedded in a matrix of a magnetocalorically passive material. At least the matrix has a microstructure characteristic of a compacted powder. Desirably, the inclusions and the matrix have a microstructure characteristic of a compacted powder.

In another particular embodiment is disclosed a composite article having a solid matrix comprising a magnetocalorically passive material, and having a microstructure characteristic of a sintered powder, and having a plurality of inclusions comprising a magnetocalorically active material at least partially embedded in the matrix. Desirably, the inclusions may also have a microstructure characteristic of a sintered powder.

In another particular embodiment is disclosed a method of manufacturing a composite article comprising:

providing a first powder comprising a magnetocalorically active material, providing a second powder comprising a magnetocalorically passive material, mixing the first powder and the second powder together to form a powder mixture, and compacting the powder mixture to form a composite article.

In another embodiment is disclosed a heat exchanger comprising one or more of the composite articles disclosed herein. This heat exchanger may form part of a refrigeration system, such as a individual, commercial, or domestic freezer, or may form part of a climate control device, such as an air conditioning unit.

BRIEF DESCRIPTION OF DRAWINGS

Embodiments described herein will now be described in more detail with reference to the drawings.

DETAILED DESCRIPTION OF SPECIFIC EMBODIMENTS

Herein, the term "matrix" is defined as the magnetocalorically passive material, irrespective of its volume fraction and distribution.

A "magnetocalorically active material" is defined herein as a material which undergoes a change in entropy when it is subjected to a magnetic field. The entropy change may be the result of a change from ferromagnetic to paramagnetic behaviour, for example. The magnetocalorically active material may exhibit in only a part of a temperature region an inflection point at which the sign of the second derivative of magnetization with respect to an applied magnetic field changes from positive to negative.

A "magnetocalorically passive material" is defined herein as a material which exhibits no significant change in entropy when it is subjected to a magnetic field.

"Inclusion" is defined herein as a particle or grain having a first composition which is at least partially embedded in the matrix comprising a different second composition. Inclusion also includes an agglomerate of particles or grains of a first composition which is at least partially embedded in the matrix comprising a second different composition material. A particle or agglomerate which has a portion exposed from the matrix, for example this exposed portion may provide an outer surface of the composite article, is included in this definition of "inclusion."

A "microstructure characteristic of a compacted powder" can be identified by examining a polished cross-section of the composite article using light microscopy or Scanning Electron Microscopy. A compacted powder has a microstructure which comprises a plurality of particles which at least in part touch their immediate neighbours, i.e. the contiguous particles, without interdiffusion of atoms between the contiguous particles.

The particles of a compacted powder also have lattice structure which exhibits strain and/or fractures which have occurred as a result of the pressure applied during compaction. These structural defects can be observed using Transmission Electron Microscopy.

The composite article described herein has the advantage that it can be simply produced by mixing together a first powder of a magnetocalorically active material and a second powder of a magnetocalorically passive material and then compacting the powder mixture to form a composite article. The composite article may be used in a magnetic heat exchange system as the magnetic working material without undergoing a subsequent heat treatment. Therefore, the inclusions and the matrix of the composite article after compacting have a "microstructure characteristic of a compacted powder."

The matrix of the composite article may be thought of as a binder which holds the inclusions of magnetically active material together to form a composite article. Thus magnetocalorically active material, which, particularly in the case of materials such as Gd, $La(Fe_{1-b}Si_b)_{13}$-based phases, $Gd_s(Si, Ge)_4$-based phases, $Mn(As, Sb)$-based phases, $MnFe(P, As)$-based phases, Tb—Gd-based phases, $(La, Ca, Pr, Nd, Sr)MnO_3$-based phases, Co—Mn—(Si, Ge)-based phases and $Pr_2(Fe, Co)_{17}$-based phases is brittle, can be formed into a composite article having sufficient mechanical stability to be used in a heat exchanger system due to the presence and properties of the matrix of magnetocalorically passive material.

The composite article has the advantage that the magnetocalorically active material and magnetocalorically passive material may be fabricated using known techniques. Moreover, these materials may be fabricated separately from one another before being mixed together to form the starting mixture for the composite article. Consequently, the fabrication of the two powders can be optimised separately from the optimisation of the composite article.

By controlling the compaction process appropriately, the composite article can be produced having the dimensions desired for a particular magnetic heat exchange system. The composite article may be produced having a near-net shape simply by compacting the powder mixture. The composite article is, therefore, easily produced using a simple, cost-effective manufacturing process.

The magnetocalorically active material may be used as supplied or as fabricated or may be given an additional heat treatment in order to improve the magnetocaloric properties of the powder before it is mixed with the magnetocalorically passive powder which later forms the matrix.

In a first embodiment, the matrix has an average particle size of less than 1000 μm. In a further embodiment, the inclusions have an average diameter of less than 1000 μm.

The average particle size of the matrix is defined herein as the mean of the longest dimension of each of 20 randomly selected particles in a polished cross-section of the composite article. In embodiments where the matrix has a microstructure characteristic of a sintered powder, this is essentially synonymous with the grain size of the matrix.

The average diameter of the inclusions is defined herein as the mean of the longest dimension of each of 20 randomly selected inclusions in a polished cross-section of the composite article.

In a further embodiment disclosed herein, a composite article is provided which comprises a plurality of inclusions of a magnetocalorically active material embedded in a matrix of a magnetocalorically passive material, wherein the matrix has a microstructure characteristic of a sintered powder.

The "microstructure characteristic of a sintered powder" can be identified by examining a polished cross-section of the composite article using light microscopy or Scanning Electron Microscopy. A sintered powder has a microstructure which comprises a plurality of grains which at least in part touch their immediate neighbours, i.e. the contiguous grains, wherein the interface between contiguous grains comprises material that results from interdiffusion of atoms of the materials of the contiguous grains.

Furthermore, as a result of the sintering process, the grains will generally have undergone strain relief. This strain relief can be observed using Transmission Electron Microscopy techniques since the dislocation density and lattice strain within the grains that have undergone strain relief are lower than those of compacted unsintered powder.

The composite article comprising a matrix having a microstructure characteristic of a sintered powder has the advantage that the mechanical strength of the composite article is increased due to the sintering process. This simplifies the handling of the composite article during any later production steps, for example surface finishing of the composite article, during storage and delivery of the composite article, as well as during the assembly of the composite article into a magnetic heat exchange system. Furthermore, in the case that the magnetic heat exchange system is of the type in which the magnets remain stationary and the magnetic working material is physically moved relative to the magnets, there is reduced likelihood of cracking and damage to the magnetic working material as a result of this movement when the composite article described herein is used.

The composite article comprising a matrix having a microstructure characteristic of a sintered powder is also easily produced using known powder processing techniques. For example, a powder of a magnetocalorically passive material may be mixed with magnetocalorically active material, and the powder mixture may be compacted and then sintered by applying heat.

This embodiment has the advantage that the composite article may be manufactured by embedding magnetocalorically active material in powder of a magnetocalorically passive material. This intermediate may then be sintered to produce the composite article.

In an embodiment, the inclusions comprising a magnetocalorically active material are provided in the form of a powder. In this embodiment, the inclusions as well as the matrix have a microstructure characteristic of a sintered powder.

Alternatively, the inclusions may be provided in forms other than that of powder. For example, the inclusions may be provided in the form of a skeleton structure which is embedded in a powder of a magnetocalorically passive material or in the form of a series of foils, flakes, filaments or tapes which are embedded in a powder of a magnetocalorically passive material which forms the matrix of the composite article.

The matrix and possibly the inclusions may have a grain structure characteristic of a sintered powder. This characteristic grain structure can be identified using light microscopy and or Scanning Electron Microscopy techniques. The most appropriate identification technique may depend on the average grain size. The grain structure of a sintered powder is characterised by the grain boundaries between adjacent grains, in particular between contiguous grains comprising the same material. These grains are atomically joined to one another due to interdiffusion between the contiguous grains at the interface and generally have a misorientation with respect to one another. The microstructure of the grains and of the grain boundaries can be observed using Transmission Electron Microscopy techniques.

The average grain size of the sintered composite article, in particular of the matrix, is also typically greater than the average particle size from which the article was produced. For example, the average grain size of the matrix is greater than the average particle size of the magnetocalorically passive powder.

In an embodiment, the magnetocalorically active material has a Curie temperature $T_c$ in the range 220K to 345K. The operating temperature of the magnetocalorically active material, when used in a magnetic heat exchange system, is approximately that of its Curie temperature. A magnetocalorically active material with a Curie temperature in the range 220K to 345K is suitable for applications such as domestic and commercial freezer systems, refrigeration, air conditioning or climate control systems depending on the desired operating temperature and operating temperature range.

The magnetocalorically active material is one of Gd, a $La(Fe_{1-b}Si_b)_{13}$-based phase, a $Gd_5(Si, Ge)_4$-based phase, a Mn(As, Sb)-based phase, a MnFe(P, As)-based phase, a Tb—Gd-based phase, a $(La, Ca, Pr, Nd, Sr)MnO_2$-based phase, a Co—Mn—(Si, Ge)-based phase and a $Pr_2(Fe, Co)_{17}$-based phase. These basic compositions may further comprise other chemical elements which may substitute partially or in full for the listed elements. These phases may also comprise elements which are accommodated at least in part interstitially within the crystal structure, for example, hydrogen. These phases may also include impurity elements and small amounts of elements such as oxygen.

The matrix may comprise a variety of materials. In an embodiment, the matrix comprises a material which has a higher thermal conductivity than the thermal conductivity of the inclusions of the magnetocalorically active material. This has the advantage that the efficiency of the heat exchange between the magnetocalorically active material and the heat exchange medium is increased.

In an embodiment, the matrix comprises a metal or an alloy which may comprise one or more of the elements Al, Cu, Ti, Mg, Zn, Sn, Bi and Pb.

The matrix may, alternatively or in addition, comprise a ceramic such as one or more of BeO, AlN, BN and graphite. In a further embodiment, the matrix comprises a metal or alloy and a ceramic. In a more particular embodiment, the ceramic may be provided in the form of inclusions within a metal or alloy matrix.

In a further embodiment, some or all of the inclusions may comprise a metallic corrosion protection coating. This corrosion protection coating may comprise one or more of Al, Cu and Sn. The corrosion protection coating may be applied to increase the working life of the magnetocalorically active phase since the corrosion and degradation of the magnetocalorically active material into non-magnetocalorically active phases is at least slowed, or even prevented entirely, over the working lifetime of the magnetocalorically active material, due to the corrosion protection coating.

In a further embodiment, the inclusions comprise an outer coating of an electrically isolating material. In the case of a composite article comprising inclusions and matrix having a microstructure characteristic of a compacted powder, the particles of the matrix may also comprise an outer coating of an electrically isolating material.

In the case of a composite article having a matrix with a microstructure characteristic of a sintered powder, the grain boundaries between the grains of the matrix as well as between the inclusions and the matrix may comprise an electrically isolating layer. The electrically isolating material may comprise a polymer or a ceramic such as BeO, AlN, BN or inorganic compounds such as silicates, oxides and phosphates.

A mixture of a ceramic and a metal or alloy included in the matrix or in the form of an outer coating of the inclusions and/or particle or grains of the matrix has the advantage that the average electrical resistivity of the matrix is increased with respect to a matrix that does not include the ceramic, e.g., a matrix primarily compound of a metal or alloy. This reduces the effect of eddy currents during the application and removal of the magnetic field which further increases the efficiency of the magnetic heat exchange system.

The electrically isolating coating may also provide corrosion protection for the magnetocalorically active material since it provides a physical barrier between the magnetocalorically active particle and the surrounding environment.

An electrically isolating coating has the advantage that the layer thickness may be small. Therefore, a thin ceramic coating may be provided on the particles to electrically isolate the particles from the contiguous particles without increasing the brittleness of the matrix.

The material of the matrix may be selected in order to optimise a variety of additional properties. For example, the material of the matrix may be selected so as to be easily worked by mechanical deformation techniques such as extrusion, rolling, drawing and swaging, for example. The material may, therefore, be ductile and easily workable at room temperature with or without intermediate annealing at temperatures of a few hundred ° C. This matrix material enables a composite article to be fabricated which can be easily worked after the initial fabrication of the composite article. This has the advantage that the composite article may be formed by mechanical deformation techniques into the desired final form.

Alternatively, or in addition, the material of the matrix may have a high thermal conductivity. This has the advantage that the efficiency of the heat transfer from the magnetocalorically active material to the heat exchange medium which is in contact with outer surfaces of the composite article during the operation of the composite article in a magnetic heat exchange system is increased.

The mechanical properties of the matrix may also be adjusted by selection of a single material or by selection of a mixture of materials, for example one or more ceramics and one or more metals or alloys. Thus the mechanical strength of the composite article can be increased in order to further limit possible damage to the composite article during its use in a magnetic heat exchange system.

In a particular embodiment the composite article comprising at least a matrix having a microstructure characteristic of sintered powder may have a matrix comprising an average grain size of less than 1000 μm and/or inclusions having an average diameter of less than 1000 μm.

The relative proportions of the magnetocalorically active material and of the magnetocalorically passive material may also be selected to provide the desired heat exchange characteristics for a desired total volume of the composite article. For example, the lower limit of the volume fraction of magnetocalorically active material may be limited by the desired heat exchange capacity, whether that be cooling capacity or heating capacity.

The upper limit of the volume fraction of magnetocalorically active material may be limited by the production of the composite article and/or its workability and/or corrosion stability. For example, if the volume fraction of the magnetocalorically passive material is too low, then the advantages produced by using a ductile material in order to improve the workability of the compacted article and/or the sintered composite article may not be achieved to the desired degree.

If the magnetocalorically active material corrodes in the heat exchange medium, the matrix may not provide a sufficiently good coverage of the inclusions to prevent the magnetocalorically active material coming into contact with the heat exchange medium if the fraction of the magnetocalorically passive material providing the matrix is too low and the volume fraction of the magnetocalorically active material is too high. The volume fraction of inclusions may be between 25% and 98%, preferably between 60% and 95%.

In a further embodiment, the matrix comprises a soft magnetic material. This has the advantage that the effective magnetic air gap between the magnets and the composite article in the magnetic heat exchange system is reduced. Therefore, the cooling and/or heating effect provided by the magnetocalorically active material of the composite article can be increased. In a particular embodiment, the soft magnetic material may comprise one or more of Fe, FeSi, Co or Ni.

In a further embodiment, the composite article comprises a plurality of magnetocalorically active materials, each having a different Curie temperature. This may be provided by adjusting the composition of a single magnetocalorically active phase or by providing different magnetocalorically active phases.

In a first arrangement of such an embodiment, the plurality of magnetocalorically active materials are distributed essentially homogeneously throughout the volume of the composite article.

In another arrangement of such an embodiment, the composite article comprises a plurality of layers, each layer comprising inclusions of a magnetocalorically active material having a $T_c$ which is different to the $T_c$ of the magnetocalorically active material in an adjacent layer. In a more particular arrangement, the magnetocalorically active material of each of the layers is selected, along with the order in which the layers are arranged, in order that the $T_c$ progressively increases from one end of the composite article to the other.

The use of composite articles comprising a plurality of magnetocalorically active materials having different $T_c$'s, has the advantage that the operating range of the heat exchanger in which the composite article is used is increased. The Curie temperature $T_c$ translates to the operating temperature and, since a range of $T_c$'s are provided, the operating range of the heat exchanger is increased. This enables the heat exchanger to provide cooling and/or heating over a wider operating temperature range and to provide cooling and/or heating from a starting temperature to a smaller/larger lowermost/uppermost temperature, respectively, than that possible using magnetocalorically active material having a single $T_c$.

In a particular embodiment, the composite article may further comprise an effective porosity. "Effective porosity" is used herein to describe a porosity of the composite article which has a measurable effect on the efficiency of the magnetic heat exchange.

The effective porosity comprises at least one channel within the body of the composite article in flow communication from a first side of the composite article to a second side of the composite article. The effective porosity may be in the range of 10 vol. % to 60 vol. %.

In a more particular embodiment, the effective porosity may be provided in the form of a series of interconnected channels in flow communication with each other forming a hollow network or skeleton type structure within the body of the composite article. The heat exchange fluid can then flow through the hollow network from one side of the composite article to the other.

In a particular embodiment, the effective porosity may be provided by loosely compacting the powder or by loosely compacting the powder followed by sintering to form in each case a body with a density of less than 100% such that at least a portion of the unoccupied volume provides an interconnected hollow network though which the heat exchange medium can flow.

These embodiments of a composite article having effective porosity have the advantage that the surface area of the composite article in contact with the heat exchange medium is increased. The heat exchange fluid is in contact with inner surfaces, that is the surfaces of the channels providing the porosity which are positioned within the body of the composite article, as well as with the overall outer surface of the composite article. Thus, the contact area between the composite article and the heat exchange fluid is increased. Consequently, the efficiency of the magnetic heat exchange may be further increased.

In a particular embodiment, the composite article may further comprise at least one channel. The channel may be provided in the form of a through-hole which is surrounded by the composite article or may be provided in the form of a channel in an outer surface of the composite article. One or more channels have the advantage of increasing the surface area of the composite article which can further improve the heat exchange efficiency between the composite article in contact with the heat exchanger medium and the heat exchange medium. The channel may be formed by extrusion or profile rolling, for example.

In a further embodiment, the channel is adapted to direct the flow of the heat exchange medium. The position of the channel is determined by the design of the heat exchange system in which the composite article is to operate. The channel may be adapted to direct the flow of the heat exchange medium with reduced or, optimally, minimum turbulence, in order to increase the efficiency of the heat exchange.

In a particular embodiment, the composite article may be a component of a heat exchanger, a cooling system, an air conditioning unit for a building or a vehicle, in particular an automobile, or a climate control device for a building or an automobile. The climate control device may be used as a heater in winter and as a cooler in summer by reversing the direction of the heat-exchange fluid (e.g., fluid coolant or heat exchanger medium). This is particularly advantageous for automobiles and other vehicles as the space available within the chassis for accommodating the climate control system can be limited by the design of the vehicle.

In a particular embodiment, composite article may also comprise an outer protective coating. The outer protective coating may comprise a metal, an alloy or a polymer. The material of the outer protective coating may be chosen so as to be chemically, as well as mechanically, stable during the lifetime operation of the composite article in the heat exchange medium. If the coating is applied to the finished article, in a particular embodiment it is not subjected to higher temperatures, for example during sintering, or working of the composite article. In this case, a polymer with a relatively low decomposition temperature or melting temperature may be used.

In certain embodiments, heat exchange medium may comprise ethanol, or glycol, mixtures of water, ethanol or glycol, or an alternative material with a high thermal conductivity, in order to increase the efficiency of the heat exchange between the heat exchange medium and the composite article. The heat exchange medium may be corrosive to the magnetocalorically active material and/or the magnetocalorically passive material of the matrix. Therefore, an additional outer protective coating may be used to provide additional protection.

Also disclosed herein are methods of manufacturing a composite article. A particular embodiment of a method comprises:
  providing a first powder comprising a magnetocalorically active material,
  providing a second powder comprising a magnetocalorically passive material,
  mixing the first powder and the second powder together to form a powder mixture, and
  compacting the powder mixture to form a composite article.

The first powder and the second powder may be mixed using known powder mixing techniques, such as ball mixing or attrition milling. The average particle size of the first powder and the second powder may also be reduced as a result of the mixing process.

The powder mixture may be compacted to form the composite article using known methods. For example, the powder may be placed into a die and compacted by applying pressure. The powder may also be compacted by rolling the powder mixture itself, by rolling a partially compacted or pre-compacted article or by rolling an encapsulated preform containing the powder mixture or an at least partially compacted powder mixture. To produce a preform, the powder mixture may be enveloped in a mantle before compaction using a method such as a powder-intube type method.

The composite article comprising a mixture of compacted powders of differing compositions may be referred to as a green body since the composite article has not been subjected to a heat treatment process. In a first embodiment, the compacted powder mixture is not subjected to further heat treatment after its production and is used in a magnetic heat exchanger in this unsintered condition.

This embodiment has the advantage that the composite article is formed directly from a powder mixture without additional heat treatment. The manufacturing process is simple and cost-effective, since the use of one or more additional heat treatments on the composite article is avoided.

In a more particular embodiment, the first powder comprises a plurality of particles which are coated with a metallic corrosion protection coating before the first powder is mixed with the second powder. The metallic corrosion protection coating may be applied to the first powder by electro-plating or electroless plating for example.

In a further embodiment, the particles of the first powder are coated with an electrically isolating material before the first powder is mixed with the second powder.

If, in a particular embodiment, it is desired to electrically isolate the particles or grains of the matrix, this can be performed by coating the particles of the second powder with an electrically isolating material before the second powder is mixed with the first powder.

In order to reduce the effect of eddy currents further, in particular embodiments the particles of both the first and second powder may comprise an electrically isolating layer. This can be applied to the powders before they are mixed together. The composition of the electrically isolating layer of the first powder may differ from the composition of the electrically isolating layer of the second powder. This enables the coating to be selected specifically for the differing compositions of the two powders. This may be advantageous to improve the adhesion of the coating to the particle by the appropriate selection of the composition of the electrically isolating material.

Alternatively, the first powder may be mixed with the second powder and then afterwards the particles of the powder mixture are coated with the electrically isolating material. In this case both the particles of the first and second powder comprise an electrically isolating layer of the same composition.

In a particular embodiment, the coating of the electrically isolating material also functions as a corrosion protection coating. In such an embodiment, an additional corrosion protection coating may or may not be included.

In an embodiment, additionally one or more of a lubricant, an organic binder and a dispersant are added to the powder mixture. These additive components may be used to improve mixing of the first powder and the second powder, in the case of a binder and/or dispersant, and/or to improve the density of compaction which is achieved during the compaction step, in the case of a lubricant. The lubricant can, for example, enable the particles to slide over one another more effectively, thus increasing the density of the compacted powder mixture and the density of the composite article both in the compacted state as well as in the sintered state in embodiments where sintering occurs.

In a particular embodiment, powder mixture may be compacted under a pressure in the range of 10 MPa to 3000 MPa. The density of the composite article generally increases with increasing applied pressure. This relationship is, however, not linear so that a practical upper limit to the pressure may arise above which the increase in density is not outweighed by the increased complexity involved in applying the higher pressure. If the pressure applied is too low, then the compacted composite article may not have the desired mechanical integrity for reliable use in a magnetic heat exchange system. The pressure may be applied using a method such as rolling or pressing.

In a further embodiment, the powder mixture is enveloped in a mantle before the powder mixture is compacted. The powder mixture may also be partially compacted to form a self supporting body before being enveloped in the mantle and further compacted within the mantle.

The powder mixture may be compacted at room temperature. Alternatively, the powder may be compacted as a temperature of between 30° C. and 250° C.

An elevated temperature during compacting has the advantage that the density of the green body can be increased. Dependent on the temperature, a degree of sintering may also occur during the compaction process so that the mechanical integrity of the composite article is further increased. If additives are provided in the powder mixture, they may also be removed during the compaction process at an elevated temperature due to their evaporation and/or decomposition into gaseous components.

Particular embodiments relate to methods to provide a composite article in which at least the second powder providing the matrix is sintered and has a microstructure characteristic of a sintered powder.

In a further embodiment, after the powder mixture is compacted to form a green composite article, a heat treatment is carried out on the compacted composite article. The heat treatment may be carried out such that the powder particles of the matrix sinter together, thus improving the mechanical strength of the composite article.

In a particular embodiment, the heat treatment may be carried out at temperatures between 300° C. and 1200° C. for a time of between two hours and 10 hours. The temperature and time may be selected so as to optimise the sintering process and densification of the composite article and, typically, depends on the material used for the magnetocalorically active material and of the magnetocalorically passive material.

The heat treatment may also be performed in order to improve the magnetocaloric properties of the magnetocalorically active material. For example, the $T_c$ may be increased or the sharp-ness of the transition providing the entropy change can be increased.

In particular embodiments, this heat treatment may be carried out under vacuum or in a protective atmosphere. A protective atmosphere may be provided by a noble gas, such as argon, or by a gas which is inert with respect to the composite article. The gas may be selected so as to avoid degradation of the magnetocalorically active material and/or magnetocalorically passive material due to be elevated temperature used for the heat treatment. The gas may also be selected so that residual undesired elements such as oxygen and carbon are removed during the heat treatment.

During the heat treatment, the composition of the magnetocalorically active material may be modified by the interstitial incorporation of elements, such as hydrogen and/or nitrogen, delivered by the atmosphere.

In a further embodiment, a second compaction process is carried out on the composite article. The second compaction process may be carried out on the compacted composite article resulting from the first compaction, that is the green body, or on the composite article after it has been subjected to a heat treatment and sintered. A second compaction process may be used to further increase the density of the composite article. A second compaction process may be advantageous if additives, such as a lubricant, binder and/or dispersant, are used in the powder mixture which is removed or burnt out during the first heat treatment. This can result in porosity within the composite article which can, if desired, be reduced by means of a second compaction process.

The degree of compaction achieved during a second compaction or sizing process may range from 5% to 50%.

Therefore, in a particular embodiment of the method, the compacted composite article is first given a heat treatment at a relatively low temperature to remove additives, and is then subjected to a second compaction process, and a second heat treatment at a higher temperature during which sintering takes place. The result is a composite article in which at least the matrix has a microstructure characteristic of a sintered powder.

After the production of a composite article, whether it comprises compacted powder or sintered powder, one or more further finishing procedures may be carried out. A finishing procedure may be one in which the final profile of the composite article is produced. The final profile may be produced by grinding and/or polishing the outer surface of the composite article, for example.

An additional possible finishing procedure may comprise further working of the composite article in order to form the final desired dimensions. For example, the composite article may be subjected to the further mechanical deformation process such as extruding, rolling, drawing and/or swaging, for example. One or more channels for directing the flow of the heat exchange medium may be formed in the composite article during one of these finishing procedures.

In a particular embodiment, the composite article may be also be coated with an outer protective coating. This outer protective coating may be applied by dipping, spraying or electro-plating.

In a more particular embodiment, the outer protective coating may be applied to the composite article after the sintering heat treatment is carried out. This has the advantage that thermally sensitive materials may be used for the protective coating, since the coating is not subjected to the sintering heat treatment.

In a further embodiment, the outer protective coating is applied to the compacted composite article. This method may be used e.g., when the composite article is to remain unsintered. However, if e.g., the composite article is to be sintered, the protective coating may be applied before the sintering heat treatment in order to protect the intermediate product.

Figure 1:
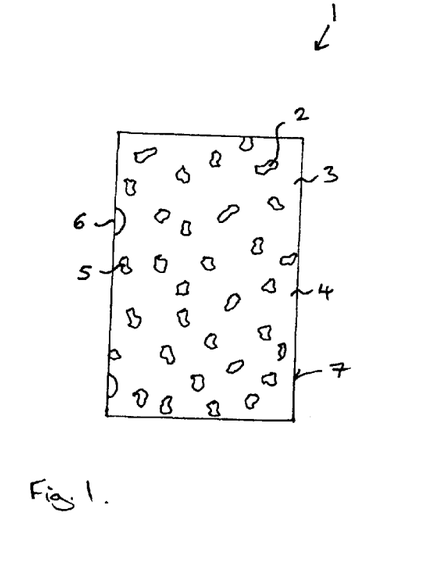
FIG. 1 is a schematic diagram showing a composite article according to a first embodiment disclosed herein.

FIG. 1 illustrates a composite article 1 according to a first embodiment described herein. The composite article 1 comprises a first powder 2 comprising a magnetocalorically active material and a second powder 3 comprising a magnetocalorically passive powder. In this particular example of this embodiment, the magnetocalorically active powder 2 consists essentially of $La(Fe_{1-a-b}Co_aSi_b)_{13}$ with a $T_c$ of 20° C. and the magnetocalorically passive powder 3 consists essentially of copper. Copper has a high thermal conductivity and is ductile so that the composite article 1 can be worked by mechanical deformation processes if desired.

The two powders 2, 3 are mixed together and compacted in a press to produce composite article 1 which is self-supporting and has a sufficient degree of mechanical strength to be used as the working component in a non-illustrated magnetic heat exchange system. The magnetic heat exchange system may be of a known type.

The copper particles 3 providing the magnetocalorically passive powder provide a matrix 4 in which inclusions 5 of magnetocalorically active powder 2 are embedded. The inclusions 5 are distributed and embedded within the matrix 4. Some of the inclusions 5 of magnetocalorically active material 2 have portions 6 which are exposed from the matrix 4 and provide regions of the outer surface 7 of the composite article 1.

The inclusions 5 and the matrix 4 each have a microstructure which is characteristic of a compacted powder.

The copper powder 3 providing the matrix 4 has a higher thermal conductivity than the magnetocalorically active material 2. The matrix 4, in addition to functioning as a binder, also improves the heat exchange efficiency between the magnetocalorically active inclusions 5 and the heat exchange medium within which the composite article 1 is positioned when it is in use in a magnetic heat exchange system.

Figure 2:
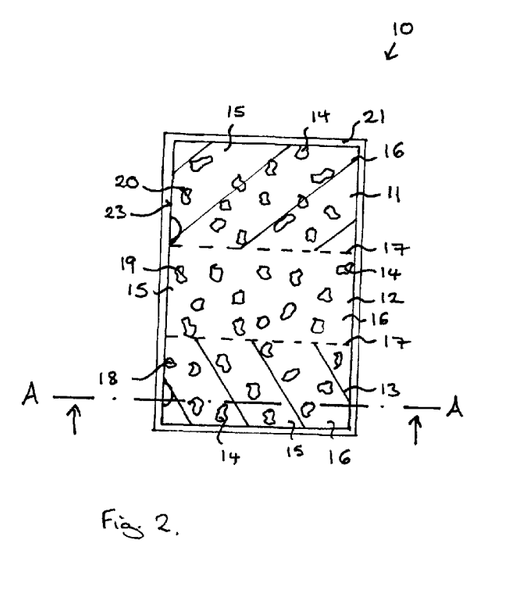
FIG. 2 is a schematic diagram showing a composite article according to a second embodiment disclosed herein.

FIG. 2 illustrates a composite article 10 according to a second embodiment disclosed herein.

The composite article 10 comprises three layers, first layer 11, second layer 12, and third layer 13. Each layer 11, 12, 13 comprises a plurality of inclusions 14, each consisting essentially of a magnetocalorically active material, which is embedded in a matrix 15 comprising magnetocalorically passive material 16. In this particular example of this embodiment, the magnetocalorically passive material 16 providing the matrix 15 of each of the layers 11, 12, 13 consists essentially of copper. The boundary between adjacent layers is indicated in the figure by a dashed line 17.

In a particular example of this embodiment, the composite article 10 is built up from three layers 11, 12, 13. The lower layer 13 comprises inclusions 14 of a first magnetocalorically active material 18 with a $T_c$ of 3° C. The second layer 12 is positioned adjacent to the first layer 13 and comprises inclusions 14 of second magnetocalorically active material 19 with a $T_c$ of 15° C., which is greater than the $T_c$ of 3° C. of the first magnetocalorically active material 18 of the first layer 13. The third layer 13, which is positioned adjacent to the second layer 12, comprises inclusions 14 of a third magnetocalorically active phase 20 having a $T_c$ of 29° C. which is greater than the $T_c$ of 15° C. of the second magnetocalorically active material of the second layer. The $T_c$ of the inclusions 14 of the composite 10 increases from one side of the composite article 10 to the other, i.e., from bottom to top in the orientation of FIG. 2.

The illustrated example of this embodiment of composite article 10 also comprises an outer coating 21 which comprises a polymer. The polymer can be applied to the composite article 10 after the sintering process by spraying the composite article 10 with the polymer. The outer coating 21 provides a protective coating which prevents the magnetocalorically active materials 18, 19 and 20 from coming into contact with the atmosphere and heat exchange medium of the heat exchange system, thus preventing corrosion of the magnetocalorically active materials 18, 19 and 20 and of the composite article 10.

The use of a plurality of layers 11, 12, 13 each having a progressively higher $T_c$ has the advantage that the operating temperature range of the composite article 10 is increased compared to that of a composite article comprising a magnetocalorically active material having a single $T_c$.

In a further embodiment not illustrated in the figures, the composite article comprises a plurality of materials each having a different $T_c$. These plurality of materials are mixed throughout the volume of the composite article rather than being arranged in layers as illustrated in FIG. 2.

In contrast to the embodiment illustrated by FIG. 1, the composite article 10 is subjected to a heat treatment which results in sintering of the powder 15 and the matrix 16. Therefore, in this example of this embodiment, the matrix 16 has a microstructure characteristic of a sintered powder.

The composite article 10 is fabricated by first fabricating three different powder mixtures. The first powder mixture comprises first magnetocalorically active material 18 with a $T_c$ of 3° C. and copper powder, which will form matrix 15, the second powder comprises second magnetocalorically active material 19 with a $T_c$ of 15° C. and copper powder and the third powder mixture comprises third magnetocalorically active material 20 with a $T_c$ of 29° C. and copper powder.

A layer 11 of the first powder mixture is placed into a die, followed by a layer 12 of the second powder mixture and finally followed by a layer 13 of the third powder mixture. The layered arrangement of the powder mixtures is compacted under a pressure of 600 MPa and is then given a sintering heat treatment at 1000° C. in order to produce a sintered composite article 10.

Figure 3:
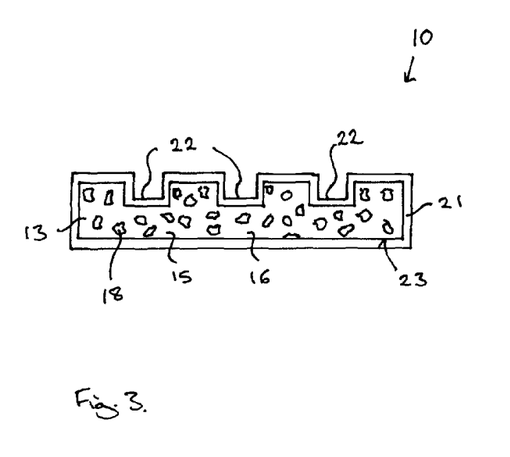
FIG. 3 is a schematic diagram showing a cross-sectional view along the line A-A of the composite article of FIG. 2.

A plurality of generally parallel channels 22 are then formed in the outer surface 23 of the composite article by profile rolling. The channels 22 are illustrated in FIG. 3.

The channels 22 each have dimensions and are arranged in the outer surface 23 so as to be adapted to direct the flow of a heat exchange medium in the direction of the desired heat transfer when the composite article 10 is positioned in a non-illustrated heat exchange system. The channels 22 are arranged to extend from the low $T_c$ first layer 11 to the high $T_c$ third layer 13.

In the particular embodiment illustrated, composite article 10 is then sprayed with a polymer to provide the outer protective coating 21.

In a further non-illustrated embodiment, additionally, one or more of a lubricant, an organic binder and a dispersant are added to the powder mixture before its compaction, preferably before the mixing procedure. A lubricant can help to increase the density of the compacted composite article 1, 10, as described above. A binder and/or a dispersant can help to provide a uniform distribution of inclusions 5, 14 within the matrix 4, 15.

Although the layered structure has been illustrated in FIG. 2 as comprising three layers, embodiments including any number of layers, including only a single layer, may be produced by similar processes for the production of a sintered composite article. Similarly, a compacted unsintered green composite article with layers comprising magnetocalorically active material of different $T_c$ may also be produced using the above process for layering of the different powders. The process differs from that described in connection with the embodiment of FIG. 2 in that no heat treatment is performed on the layered composite article after the compaction process.

Figure 4:
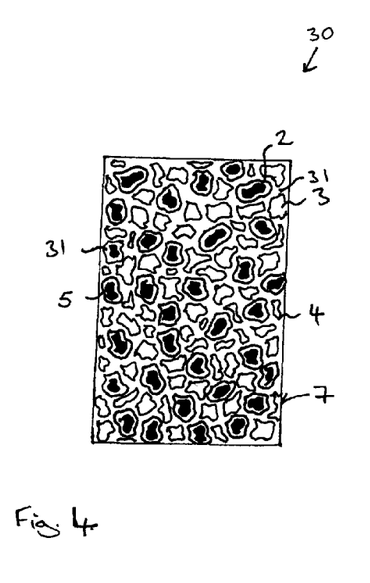
FIG. 4 is a schematic diagram showing a composite article according to a third embodiment disclosed herein.

FIG. 4 illustrates a composite article 30 according to a third embodiment. The composite article 30 is similar to the composite article 1 of the first embodiment illustrated in FIG. 1, but differs from the composite article 1 of the first embodiment in that the inclusions 5 of first powder of magnetocalorically active material 2, as well as the matrix 4 (containing in this example, copper particles as the second powder 3) are coated with an electrically isolating material 31.

For clarity of illustration, in FIG. 4 the inclusions 5 of the magnetocalorically active powder 2 are shaded black while the magnetocalorically passive copper particles 3 of the matrix 4 are unshaded. It should also be noted that the thickness of the electrically isolating coating as well as the size of the particles has been exaggerated for illustrative purposes.

The inclusions 5 and the particles of the second powder 3 of the matrix 4 are electrically isolated from one another by the electrically isolating coating 31. The provision of the electrically isolating coating 31 has the advantage that the production of eddy currents during the application and removal of a magnetic field are reduced, which leads to an increase in the efficiency of the magnetic heat exchange system.

The electrically isolating coating 31 may contain a polymer or a ceramic, for example. The particles of the two powders 2, 3 may be coated with an electrically isolating material before they are mixed together or the two powders 2, 3 may first mixed together and the electrically isolating coating 31 applied to the outer surfaces of the particles of the powder mixture.

In a further example of this embodiment, the composite article 30 is subjected to a heat treatment which results in sintering of the powder 3 providing the matrix 4, so that the matrix 4 has a microstructure characteristic of a sintered powder. In this embodiment, the electrically isolating coating 31 is present at the grain boundaries between the grains of the sintered matrix 4 as well as at the grain boundaries between the inclusions 5 and the sintered matrix 4.

The electrically isolating coating 31 may also provide protection against corrosion. This is particularly advantageous for composites in which the inclusions 5 of the magnetocalorically active material are coated with an electrically isolating coating or layer, since some magnetocalorically active materials tend to corrode upon exposure to the atmosphere instead of, or in addition to, upon exposure to the heat transfer medium.

Figure 5:
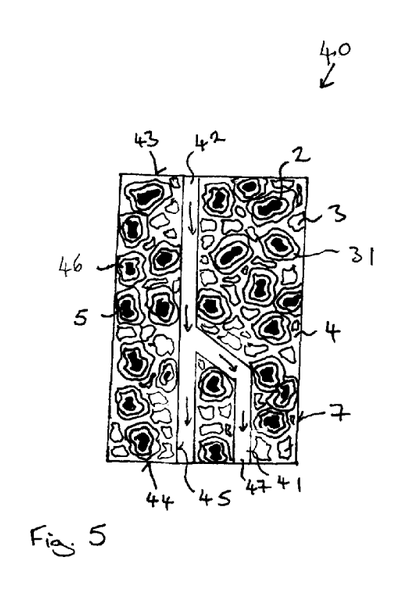
FIG. 5 is a schematic diagram showing a composite article according to a fourth embodiment disclosed herein.

FIG. 5 illustrates a composite article 40 according to a fourth embodiment. The composite article 40 differs from the previous embodiments in that the composite article further comprises an effective porosity 41.

For clarity of illustration, in FIG. 5 the inclusions 5 of the magnetocalorically active powder 2 are shaded black while the magnetocalorically passive copper particles 3 are unshaded.

In the fourth embodiment, the composite article 40 comprises an effective porosity which enables the heat exchange fluid to pass through the composite article 40. The porosity 41 comprises a plurality of interconnected channels 42 providing a skeleton type structure of channels 42 throughout the composite article 40, a sufficient number of which are open at one or two ends at the outer surface 7 of the composite article 40. The heat exchange medium is thus able to flow from one side 43 of the composite article 41 to the opposite side 44 as indicated by the arrows through the network of channels 42. In FIG. 5 only one through channel 42 and a branch channel 47 from the through channel 42 of the network providing the porosity 41 are illustrated. However, it will be understood that other arrangements, numbers of through channels, and degrees of interconnection, are possible The heat exchange fluid is able to contact the inner surfaces 45 provided by the porous structure 42 as well as the outer surface 7 of the composite article 40.

The surface area of the composite article 40 is increased due to the presence of the effective porosity 41 and, furthermore, the contact area between the composite article 40 and the heat exchange medium is increased. Consequently, the efficiency of the magnetic heat exchange may be further increased.

In the particular example of the fourth embodiment illustrated, the inclusions 5 comprising magnetocalorically active material further comprise a metallic corrosion protection coating 46. The corrosion protection coating 46 is copper and is arranged between the outer surface of the magnetocalorically active material of the individual inclusions 5 and the electrically isolating coating 31. The inclusions 5, therefore, comprise two coatings. This has the advantage that the properties of each coating layer can be optimized separately.

An additional corrosion protection layer 46 is useful in a composite article 40 having an effective porosity 41 since some of the inclusions 5 border on the channels 42 and form a portion of the surface 45 of the channel 42. The corrosion protection coating 46 provides additional protection for these portions of the inclusions 5 which are not completely embedded in the matrix 3 and which can come into contact with the environment and the heat exchange fluid.

It should also be noted that the thickness of the corrosion protection coating 46 and the electrically isolating coating 31, as well as the size of the particles 3, 5 and the channels 42, 47, has been exaggerated for illustrative purposes in FIG. 5.

In a further non-illustrated embodiment, the inclusions 5 include only a metallic corrosion protection coating 46, that is the inclusions 5 are not provided with an additional outer electrically isolating layer 31.

The composite article 1; 10; 30; 40 may be used as the working component of a heat exchanger, a refrigeration system, a climate control device, an air-conditioning unit, or an industrial, commercial or domestic freezer.

The invention having been thus described with reference to certain specific embodiments and examples thereof, it will be understood that this is illustrative, and not limiting, of the appended claims.

The invention claimed is:

1. A composite article, comprising:
   (a) a solid matrix comprising a magnetocalorically passive material and having a microstructure comprising a plurality of particles of magnetocalorically passive material that have lattice structure that exhibits strain, or fractures, or both, from compression, and that, at least in part, touch one or more immediately neighboring particles of magnetocalorically passive material; and
   (b) a plurality of solid inclusions comprising a magnetocalorically active material at least partially embedded in the solid matrix, wherein the inclusions either:
      (1) have a microstructure comprising a plurality of particles of magnetocalorically active material that have lattice structure that exhibits strain, or fractures, or both from compression, and that, at least in part, touch one or more immediately neighboring particles of magnetocalorically passive material, or
      (2) form a series of foils, flakes, or tapes embedded in the matrix.

2. Composite article according to claim 1, wherein the microstructure of the matrix comprises particles having an average particle size of less than 1000 μm.

3. Composite article according claim 1, wherein the inclusions have an average diameter of less than 1000 μm.

4. Composite article according to claim 1, wherein the inclusions further comprise a metallic corrosion protection coating.

5. Composite article according to claim 4, wherein the metallic corrosion protection coating comprises one or more of Al, Cu, or Sn.

6. Composite article according to claim 1, wherein the inclusions further comprise an outer coating of an electrically isolating material.

7. A composite article, comprising:
   (a) a solid matrix comprising a magnetocalorically passive material and having a microstructure comprising a plurality of particles of magnetocalorically passive material that have lattice structure that exhibits strain, or fractures, or both, from compression, and that, at least in part, touch one or more immediately neighboring particles of magnetocalorically passive material;
   (b) a plurality of solid inclusions comprising a magnetocalorically active material at least partially embedded in the solid matrix, wherein the inclusions either:
      (1) have a microstructure comprising a plurality of particles of magnetocalorically active material that have lattice structure that exhibits strain, or fractures, or both from compression, and that, at least in part, touch one or more immediately neighboring particles of magnetocalorically passive material, or
      (2) form a series of foils, flakes, or tapes embedded in the matrix; and
   (c) an outer coating of an electrically isolating material disposed on at least some of the particles of magnetocalorically passive material.

8. Composite article according to claim 6, wherein the electrically isolating material comprises a polymer, or a ceramic, or an inorganic compound.

9. A composite article, comprising:
   (a) a solid matrix comprising a magnetocalorically passive material having a sintered microstructure comprising a plurality of grains of magnetocalorically passive material that have lattice structure that exhibits strain relief, and that, at least in part, touch one or more immediately neighboring grains of magnetocalorically passive material via an interface comprising interdiffused atoms from the neighboring grains, resulting from sintering a compressed powder of magnetocalorically passive material;

(b) a plurality of solid inclusions comprising a magnetocalorically active material at least partially embedded in the solid matrix.

10. Composite article according to claim 9, wherein the inclusions further comprise a metallic corrosion protection coating.

11. Composite article according to claim 10, wherein the corrosion protection coating comprises one or more of Al, Cu, or Sn.

12. Composite article according to claim 9, wherein the inclusions further comprise an outer coating of an electrically isolating material.

13. A composite article, comprising:
(a) a solid matrix comprising a magnetocalorically passive material having a sintered microstructure comprising a plurality of grains of magnetocalorically passive material that have lattice structure that exhibits strain relief, and that, at least in part, touch one or more immediately neighboring grains of magnetocalorically passive material via an interface comprising interdiffused atoms from the neighboring grains, resulting from sintering a compressed powder of magnetocalorically passive material;
(b) a plurality of solid inclusions comprising a magnetocalorically active material at least partially embedded in the solid matrix; and
(c) an outer coating of an electrically isolating material.

14. Composite article according to claim 12, wherein the electrically isolating material comprises a polymer, a ceramic, or an inorganic compound.

15. Composite article according to claim 1, wherein the magnetocalorically active material has a Curie temperature $T_c$ in the range 220K to 345K.

16. Composite article according to claim 1, wherein the magnetocalorically active material is one or more of Gd, a $La(Fe_{1-b}Si_b)_{13}$-based phase, a $Gd_5(Si, Ge)_4$-based phase, a Mn(As, Sb)-based phase, a MnFe(P, As)-based phase, a Tb—Gd-based phase, a (La, Ca, Pr, Nd, Sr)$MnO_3$-based phase, a Co—Mn—(Si, Ge)-based phase, or a $Pr_2(Fe, Co)_{17}$-based phase.

17. Composite article according to claim 1, wherein the matrix comprises one or more of the elements, Al, Cu, Ti, Mg, Zn, Sn, Bi and Pb.

18. A composite article, comprising:
(a) a solid matrix comprising a magnetocalorically passive material and having a microstructure comprising a plurality of particles of magnetocalorically passive material that have lattice structure that exhibits strain, or fractures, or both, from compression, and that, at least in part, touch one or more immediately neighboring particles of magnetocalorically passive material; and
(b) a plurality of solid inclusions comprising a magnetocalorically active material at least partially embedded in the solid matrix, wherein the inclusions either:
(1) have a microstructure comprising a plurality of particles of magnetocalorically active material that have lattice structure that exhibits strain, or fractures, or both from compression, and that, at least in part, touch one or more immediately neighboring particles of magnetocalorically passive material, or
(2) form a series of foils, flakes, or tapes embedded in the matrix, wherein the matrix comprises one or more of BeO, AlN, BN, or graphite.

19. Composite article according to claim 9, wherein the matrix comprises grains having an average grain size of less than 1000 μm.

20. Composite article according to claim 9, wherein the inclusions have an average diameter of less than 1000 μm.

21. A composite article, comprising:
(a) a solid matrix comprising a magnetocalorically passive material and having a microstructure comprising a plurality of particles of magnetocalorically passive material that have lattice structure that exhibits strain, or fractures, or both, from compression, and that, at least in part, touch one or more immediately neighboring particles of magnetocalorically passive material; and
(b) a plurality of solid inclusions comprising a magnetocalorically active material at least partially embedded in the solid matrix, wherein the inclusions either:
(1) have a microstructure comprising a plurality of particles of magnetocalorically active material that have lattice structure that exhibits strain, or fractures, or both from compression, and that, at least in part, touch one or more immediately neighboring particles of magnetocalorically passive material, or
(2) form a series of foils, flakes, or tapes embedded in the matrix, wherein the inclusions are present in a volume fraction of between 25% and 98% of the volume of the composite article.

22. Composite article according to claim 21, wherein the volume fraction of inclusions is between 60% and 95%.

23. A composite article, comprising:
(a) a solid matrix comprising a magnetocalorically passive material and having a microstructure comprising a plurality of particles of magnetocalorically passive material that have lattice structure that exhibits strain, or fractures, or both, from compression, and that, at least in part, touch one or more immediately neighboring particles of magnetocalorically passive material; and
(b) a plurality of solid inclusions comprising a magnetocalorically active material at least partially embedded in the solid matrix, wherein the inclusions either:
(1) have a microstructure comprising a plurality of particles of magnetocalorically active material that have lattice structure that exhibits strain, or fractures, or both from compression, and that, at least in part, touch one or more immediately neighboring particles of magnetocalorically passive material, or
(2) form a series of foils, flakes, or tapes embedded in the matrix, wherein the matrix comprises a soft magnetic material.

24. Composite article according to claim 23, wherein the soft magnetic material comprises one or more of Fe, FeSi, Co, or Ni.

25. A composite article, comprising:
(a) a solid matrix comprising a magnetocalorically passive material and having a microstructure comprising a plurality of particles of magnetocalorically passive material that have lattice structure that exhibits strain, or fractures, or both, from compression, and that, at least in part, touch one or more immediately neighboring particles of magnetocalorically passive material; and
(b) a plurality of solid inclusions comprising a magnetocalorically active material at least partially embedded in the solid matrix, wherein the inclusions either:
(1) have a microstructure comprising a plurality of particles of magnetocalorically active material that have lattice structure that exhibits strain, or fractures, or both from compression, and that, at least in part, touch one or more immediately neighboring particles of magnetocalorically passive material, or (2) form a series of foils, flakes, or tapes embedded in the matrix, wherein the inclusions are disposed in a plurality of layers, each layer comprising inclusions of a magnetocalorically active material having a $T_c$ which is different from the $T_c$ of the magnetocalorically active material in an adjacent layer.

26. A composite article, comprising:
(a) a solid matrix comprising a magnetocalorically passive material and having a microstructure comprising a plurality of particles of magnetocalorically passive material that have lattice structure that exhibits strain, or fractures, or both, from compression, and that, at least in part, touch one or more immediately neighboring particles of magnetocalorically passive material; and
(b) a plurality of solid inclusions comprising a magnetocalorically active material at least partially embedded in the solid matrix, wherein the inclusions either:
(1) have a microstructure comprising a plurality of particles of magnetocalorically active material that have lattice structure that exhibits strain, or fractures, or both from compression, and that, at least in part, touch one or more immediately neighboring particles of magnetocalorically passive material, or
(2) form a series of foils, flakes, or tapes embedded in the matrix, further comprising a surface having at least one channel therein.

27. Composite article according to claim 26, wherein the at least one channel is adapted to direct the flow of a heat exchange medium in contact with the surface.

28. A composite article, comprising:
(a) a solid matrix comprising a magnetocalorically passive material and having a microstructure comprising a plurality of particles of magnetocalorically passive material that have lattice structure that exhibits strain, or fractures, or both, from compression, and that, at least in part, touch one or more immediately neighboring particles of magnetocalorically passive material;
(b) a plurality of solid inclusions comprising a magnetocalorically active material at least partially embedded in the solid matrix, wherein the inclusions either:
(1) have a microstructure comprising a plurality of particles of magnetocalorically active material that have lattice structure that exhibits strain, or fractures, or both from compression, and that, at least in part, touch one or more immediately neighboring particles of magnetocalorically passive material, or
(2) form a series of foils, flakes, or tapes embedded in the matrix; and
(c) an outer protective coating.

29. Composite article according to claim 28, wherein the outer protective coating comprises a polymer, or a metal, or an alloy.

30. A composite article, comprising:
(a) a solid matrix comprising a magnetocalorically passive material and having a microstructure comprising a plurality of particles of magnetocalorically passive material that have lattice structure that exhibits strain, or fractures, or both, from compression, and that, at least in part, touch one or more immediately neighboring particles of magnetocalorically passive material;
(b) a plurality of solid inclusions comprising a magnetocalorically active material at least partially embedded in the solid matrix, wherein the inclusions either:
(1) have a microstructure comprising a plurality of particles of magnetocalorically active material that have lattice structure that exhibits strain, or fractures, or both from compression, and that, at least in part, touch one or more immediately neighboring particles of magnetocalorically passive material, or
(2) form a series of foils, flakes, or tapes embedded in the matrix; and
(c) an effective porosity.

31. Composite article according to claim 30, wherein the effective porosity comprises at least one channel within the body of the composite article providing flow communication from a first side of the composite article to a second side of the composite article.

32. Composite article according to claim 30, wherein the effective porosity comprises 10 vol. % to 60 vol. % of the composite article.

33. Composite article according to claim 9, wherein the inclusions either:
(1) have a microstructure comprising a plurality of grains of magnetocalorically active material that have lattice structure that exhibits strain relief, and that, at least in part, touch one or more immediately neighboring grains of magnetocalorically active material via an interface comprising interdiffused atoms from the neighboring grains, resulting from sintering a compressed powder of magnetocalorically active material; or
(2) form a series of foils, flakes, or tapes embedded in the matrix.

34. Composite article according to claim 33, wherein the inclusions have a microstructure comprising a plurality of grains of magnetocalorically active material that have lattice structure that exhibits strain relief, and that, at least in part, touch one or more immediately neighboring grains of magnetocalorically active material via an interface comprising interdiffused atoms from the neighboring grains, resulting from sintering a compressed powder of magnetocalorically active material.

* * * * *